United States Patent [19]

Ewing et al.

[11] 4,152,816

[45] May 8, 1979

[54] METHOD OF MANUFACTURING A HYBRID TURBINE ROTOR

[75] Inventors: Bruce A. Ewing, Martinsville; Marvin Herman, Indianapolis, both of Ind.

[73] Assignee: General Motors Corporation, Detroit, Mich.

[21] Appl. No.: 804,142

[22] Filed: Jun. 6, 1977

[51] Int. Cl.² .................................................. B23P 15/04
[52] U.S. Cl. ................................. 29/156.8 R; 29/447; 228/104; 228/186; 228/193; 416/213 R
[58] Field of Search ................... 29/156.8 R, 156.8 B, 29/420, 420.5, 447; 228/189, 186, 193, 104, 221, 175; 416/213

[56] References Cited

U.S. PATENT DOCUMENTS

| | | | |
|---|---|---|---|
| 1,392,416 | 10/1921 | Henderson | 228/186 |
| 2,079,473 | 5/1937 | Wade | 416/213 R |
| 2,450,493 | 10/1948 | Strub | 416/213 R |
| 2,479,039 | 8/1949 | Cronstedt | 29/156.8 R |
| 2,769,611 | 11/1956 | Schwarzkopf | 29/447 |
| 3,246,389 | 4/1966 | Pfau | 416/213 R |
| 3,559,274 | 2/1971 | Granata | 228/193 |
| 3,579,781 | 5/1971 | Yaegashi | 29/447 |
| 3,590,454 | 7/1971 | Brass | 29/156.8 B |
| 3,601,884 | 8/1971 | Kemeny | 228/193 |
| 3,622,313 | 11/1971 | Havel | 29/156.8 R |
| 3,787,959 | 1/1974 | Moore et al. | 228/186 |
| 3,904,101 | 9/1975 | Beltran et al. | 228/175 |
| 3,905,723 | 9/1975 | Torti, Jr. | 416/213 R |
| 3,940,268 | 2/1976 | Catlin | 29/156.8 R |
| 3,980,220 | 9/1976 | Wolfe et al. | 228/186 |

FOREIGN PATENT DOCUMENTS

1441122  6/1976  United Kingdom ................ 228/221

*Primary Examiner*—C. W. Lanham
*Assistant Examiner*—Daniel C. Crane
*Attorney, Agent, or Firm*—J. C. Evans

[57] ABSTRACT

A method for manufacturing a turbine rotor assembly from dissimilar materials includes the step of preforming a turbine disc of powdered metal by direct hot isostatic pressing; machining the OD of the disc rim to an exact dimension; prefabricating a ring of airfoil elements having a circular rim with a machined ID therein fit to the OD of the turbine disc; sealing joint lines on side surfaces of the joined parts to create a vacuum at the interface with a high melt temperature sealant; thereafter diffusion bonding the joined and sealed parts by hot isostatically pressing them at temperatures in excess of 1500° F. and under fluid pressure directly applied to the parts in excess of 1000 psi to press the ring ID into intimate contact with the OD of the disc until the dissimilar materials are diffusion bonded to form a high strength butt joint therebetween.

5 Claims, 10 Drawing Figures

METHOD OF MANUFACTURING A HYBRID TURBINE ROTOR

This invention relates to hybrid turbine motor assemblies with parts of dissimilar metallurgical properties and more particularly to the method for assembling such hybrid turbine rotors.

Gas turbine rotors used in small gas turbine engines have discs and airfoil arrays that are dimensionally configured to make it difficult to mechanically connect blades of a first metallurgical composition to a disc of a second metallurgical composition. More specifically, it is recognized that the airfoil components of a turbine wheel are subjected to higher temperature operation and are preferably of a heat resistant superalloy material; while the material of the disc should have substantial ductility to withstand high stresses produced at the rim thereof.

For example, one such hybrid turbine rotor is set forth in U.S. Pat No. 2,479,039, issued Aug. 16, 1949, to D. Cronstedt. It is made by multi-stage centrifugal casting method and applies to large turbine rotors. It is difficult to mechanically couple the turbine disc of small gas turbines by conventional joints and coupling components to a blade array. Accordingly, in U.S. Pat. No. 3,940,268, issued Feb. 24, 1976, to John T. Catlin, a disc of powdered metal material is connected to a plurality of radially outwardly directed airfoil components by locating them in a mold and producing a metallurgical bond between the airfoil components and the disc during a hot isostatic formation of the disc of hub element. While blades can be bonded to a disc of a differing material by the method set forth in the aforesaid Catlin patent, hybrid or composite turbine rotor structures formed by such methods lack precision, dimensional control between adjacent airfoil components. Such control is required to maintain desired gas flow passages through adjacent ones of the airfoil components connected to the disc. Such dimensional imprecision is especially undesirable in the case of small, high speed gas turbine rotors.

In order to achieve accurate dimensional relationship between separate airfoil components in a turbine configuration, one method includes machining of the airfoil components to exact dimensional shapes and thereafter assembling the individual ones of the airfoil components in precisely machined slots in a rotor disc.

This turbine assembly method is set forth in U.S. Pat. No. 3,590,454, issued July 6, 1971, to Edward A. Brass The pre-machined pieces are fitted together and advanced by a movable platform with respect to a powerful cathode ray gun which impinges on the various joints formed between blades and the wheel disc to produce a side weld across the exposed joints as well as weld penetration to a suitable depth dependent upon the welding duration and the intensity of the cathode rays. The method requires removal of substantial quantities of material from the parts to be joined and further requires the use of high energy electron beam welding equipment and preprogrammed movable fixture devices. Further, this approach is limited by the weldability characteristics of the alloys of interest; contemporary turbine materials generally exhibit poor weldability making them unsuitable for this technique.

Accordingly, an object of the present invention is to provide a simplified method for assembling a hybrid or composite turbine rotor assembly including a disc having a first metallurgical composition and an outer array of airfoil components of a second metallurgical composition by the steps of preforming an outer airfoil array with an inner ring and airfoils at an exact dimensional form control therebetween to maintain desired aerodynamic flow paths therethrough; preforming a near-net-shape metal turbine disc having a precisely machined outer diameter dimension; machining an inside diameter of the inner ring and press fitting it on the outer diameter of the turbine rotor disc to form a near line-to-line joint therebetween; and thereafter sealing outer surface joint lines formed at the outer surface of the interface between the disc and the airfoil array ring and thereafter subjecting both the airfoil array and disc to an elevated temperature and a direct pressure thereon to produce a diffusion bond between disc and airfoil ring.

A further object is to produce the diffusion bond in the preceding object by maintaining the high temperature and high pressure conditions on the full exterior surfaces of the joined airfoil blade array and disc to cause the inside diameter of the airfoil ring to be pressed into intimate contact with the outside diameter of the disc until diffusion bonding occurs between a high alloy material of the airfoil array and a high strength powdered metal material in the disc.

Another object of the present invention is to provide an improved method for fabricating a hybrid turbine rotor including the steps of casting a solid airfoil ring of high alloy material having precisely located aerodynamic surfaces thereon and a solid continuous inner ring having an inside diameter; thereafter precisely machining the aforesaid inside diameter to a control dimension; preforming a near-net-shaped turbine disc of a high strength powder metal material with a continuously formed outer rim thereon; machining the outer rim of the turbine disc to a controlled outer diameter dimension; vacuum outgassing the premachined parts to produce clean surfaces at the ID of the airfoil ring and the OD of the turbine disc for bonding therebetween; shrink-fitting the airfoil ring to the outer diameter of the disc to provide an interface therebetween; vacuum braze sealing a joint line on either side of the joint disc and airfoil ring by applying braze alloy powder at the joint line on either side thereof and maintaining an elevated vacuum brazing temperature to seal the joint at the outside edges of the interface between the disc and the airfoil ring; and thereafter applying an elevated temperature and direct pressure against the joined airfoil ring and disc to press the interfaced surfaces of the disc and the airfoil ring into intimate contact for diffusion bonding therebetween.

Still another object of the present invention is to provide an improved method for fabricating a turbine rotor in accordance with the preceding object wherein the braze alloy powder is a boron silicon modified braze alloy having the following listed composition in percent:

| C | Hf | Cr | Mo | Al | Ti | Co | W | Zr | B | Ta | Si | Ni |
|---|----|----|----|----|----|----|---|----|---|----|----|----|
| .17 | 1.4 | 10.0 | 0.6 | 5.5 | 1.6 | 9.7 | 10.8 | .06 | 1.1 | 3.1 | 2.5 | Bal. | and wherein the vacuum seal brazing step is conducted at a temperature in the range of 2225° F. for thirty minutes following which the temperature is dropped to 2000° F. for ten minutes to permit solidification of the braze alloy powder at the joint line between the disc and the airfoil ring and thereafter increasing the vacuum braze temperature into a range of 2100° F. for one hour to permit diffusion of the baron and silicon constituents of the braze alloy material into the base metal of the airfoil ring and disc to elevate the remelt temperature characteristics of the seal; thereafter helium-leak checking the seal region; and maintaining a hot isostatic press on the joined parts by maintaining the joined parts at a temperature in the range of 2225° F. and at 15,000 p.s.i and thereafter treating the joined parts to a simulated coating diffusion cycle of 2050° F. for two hours and an age cycle of 1600° F. for twenty-four hours.

Further objects and advantages of the present invention will be apparent from the following description, reference being had to the accompanying drawings wherein a preferred embodiment of the pesent invention is clearly shown.

In practicing the present invention, an initial step includes preforming an airfoil array either as a solid ring or making an airfoil array from a plurality of component parts to form initially segmented airfoil blade rings.

The use of segmented blade or airfoil components enables directionally solidified, air cooled airfoils of the type having precisely, dimensionally controlled surfaces thereon to be utilized in a hybrid turbine wheel assembly made by the method of the present invention. An example of such directionally solidified air cooled airfoils is set forth in U.S. Pat. No. 3,732,031, issued May 8, 1973, to Charles E. Bowling et al for Cooled Airfoil.

Because of the use of a butt joint configuration used in the present invention, the existing airfoils of the type set forth in the preceding Bowling et al patent are modified by having a continuous surface at their base to define a ring having a machined inner diameter for a press-fit relationship to the outer diameter of a disc to be joined thereto.

Figure 1:
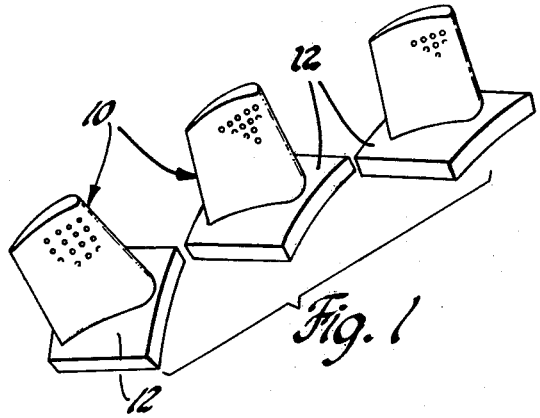
FIG. 1 is a view in perspective of airfoil array components used in practicing the present invention.

The modified air cooled blades 10 are illustrated in FIG. 1 as including a base 12 cast integrally on the blade 10 to form part of an inner ring of an airfoil array to be described.

The next step in the method of forming a hybrid or composite turbine rotor with individual blades; preferably air cooled blade components; includes steps of fabricating individual blades of the type shown in FIG. 1 into a ring.

This is accomplished by positioning and shimming individually cast blade or airfoils 10 in a tack weld fixture to form a ring of blades with a 0.003 to 0.005 inches controlled gap 14 between individual blades 10. Following positioning and shimming of individual blades, a tack weld 16 joins each of the component parts to form a bladed ring subassembly 18 as shown in FIG. 2.

Figure 2:
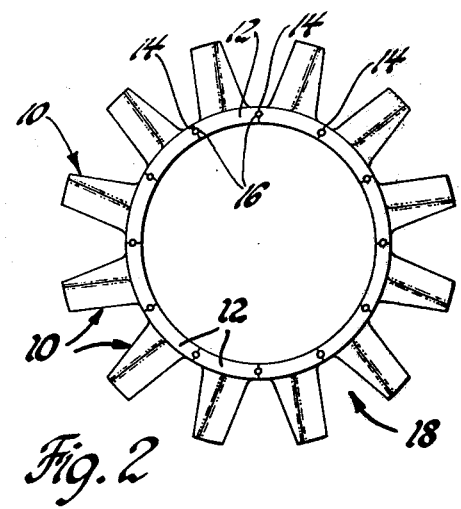
FIG. 2 is a view showing an array of airfoil components of the type shown in FIG. 1 tack welded to form a ring with an inside diameter.

The subassembly of FIG. 2 is tack welded at both the front and rear of each of the blades 10. The tack welded assembly then is vacuum outgassed at 2200° F. for one hour.

Figure 3:
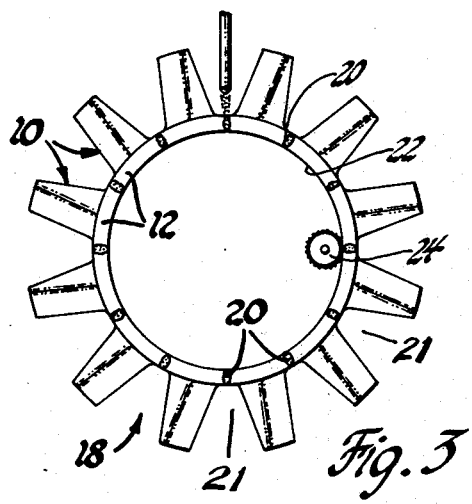
FIG. 3 shows the component parts in FIG. 2 with joints sealed by braze alloy material between the individual components in FIG. 1 with a machined ID.

The joined ring segments are then coated with a vacuum braze powder at the gaps 14 as shown at 20 in FIG. 3 to completely close the gaps 14 at outside, inside and ends of base 12 to thereby vacuum seal braze each of the exposed joint areas at the gap 14 between each of the tack welded blades 10. Preferably the braze powder is a boron-silicon modified braze powder alloy. Vacuum brazing of the ring segments as shown in FIG. 3 is accomplished under vacuum at 2240° F. for thirty minutes followed by solidification and diffusion at 2150° F. for one hour to increase to braze remelt temperature. Alternatively, the vacuum braze seal can be conducted at 2225° F. for thirty minutes, followed by a temperature drop to 2000° F. for ten minutes; thereafter, temperature is increased to 2100° F. for one hour.

Figure 4:
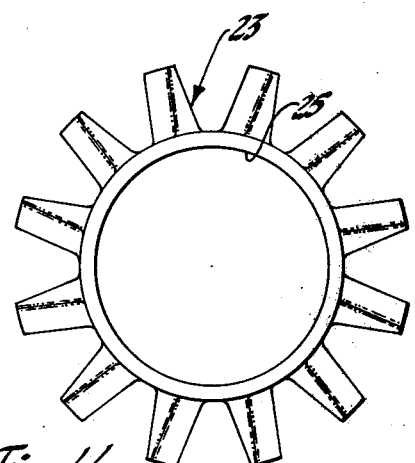
FIG. 4 shows airfoil components with a solid, continuous airfoil array ring with a ground ID.
Figure 5:
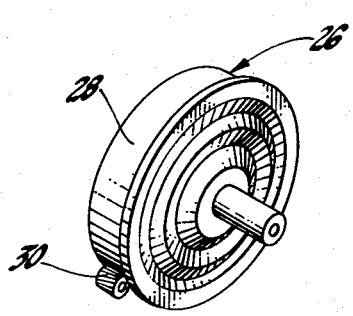
FIG. 5 shows a near-net-shape formed turbine disc preconsolidated by a hot isostatic process and including a ground OD for interference fit with the ground ID of an airfoil array ring.

After braze seal of gaps 14, the joined individual blades 10 are hot isostatically pressed with respect to one another to achieve diffusion bonding across the interface at each of the vacuum brazed joint areas, thereafter, the subassembly 18 has an inside diameter 22 thereof machined by a suitable cutting tool 24 to produce a controlled diameter within the subassembly 18 which represents an outer airfoil array or a bladed ring with an exact dimensional control between aerodynamic surfaces on adjacent blades 10 to maintain desired aerodynamic flow paths 21 between the blades 10. Alternatively, the subassembly 18 can be preformed as a single continuous unit as shown at 23 in FIG. 4 with a machined ID 25.

The method also includes preforming a disc 26 for insertion within the inside diameter 22 of the subassembly 18. The disc 26 preferably is preformed from a powdered metal composition.

The composition is hot isostatically pressed to form a consolidated disc 26 having an outside diameter at a near-net-shape corresponding to that of the inside diameter 22 of the subassembly 18.

The disc 26 is slightly oversized and therefore machined to an exactly OD dimensioned rim 28 by a cutting tool 30 so that the outside diameter of the disc will be dimensioned to provide a substantially press fit between the rim 28 and the inside diameter 22 of the joined base segments 12 of the blades 10.

Figure 6:
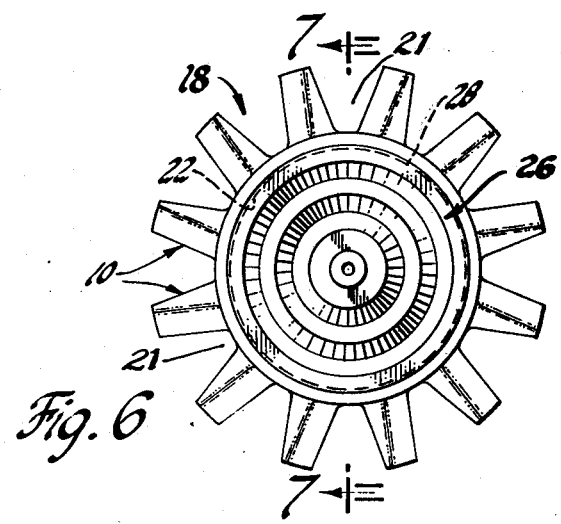
FIG. 6 shows the disc of FIG. 5 press fit to an airfoil array of the type shown either in FIG. 3 or 4.

More specifically, the ID 22 and the OD of the rim 28 are sized to produce a 0.005 inch interference fit when the disc 26 is fit within the subassembly 18 as shown in FIG. 6.

Figure 7:
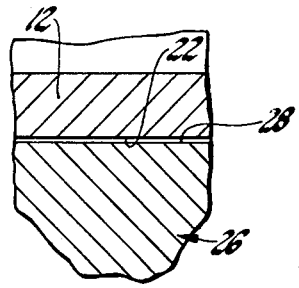
FIG. 7 is an enlarged, fragmentary cross-sectional view shown along the line 7—7 of FIG. 6 showing an accentuated interface relationship between the joined parts in FIG. 6.

The parts are joined as shown in FIG. 6 by vacuum outgassing for one hour at 2225° F. to 2250° F. Shrink fitting the parts is produced by first heating the subassembly 18 to approximately 400° F. and then slipping it on the rim 28 which is maintained at ambient temperature. Upon cool down, the ID 22 is solidly locked onto the disc rim 28 preparatory for a vacuum braze seal step in accordance with the present invention. The press fit relationship is shown accentuated in FIG. 7 wherein the inside diameter 22 of the base 12 is spaced with respect to the outer surface of the rim 28 by some dimensional difference.

Figure 8:
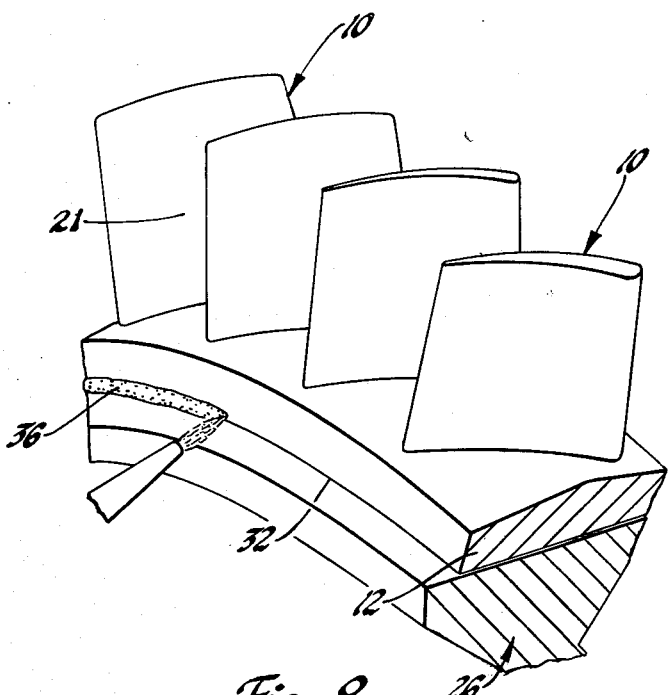
FIG. 8 is a diagrammatic showing of a joint line seal step of the present invention.
Figure 9:
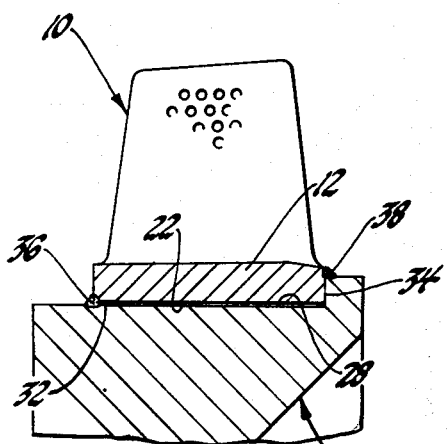
FIG. 9 shows a fragmentary cross-sectional view of the joined parts following the seal step of FIG. 8.

The next step in the process is to braze seal a continuously circumferentially formed joint line 32 on one side of the joint disc 26 and ring 10 as shown in FIG. 8 and to further vacuum braze seal a second continuously circumferentially formed joint line 34 formed on the opposite side of the joint parts in FIG. 9 by covering them with sealant layers 36, 38 respectively.

Materials used in one working embodiment are as follows:

|  | Si | C | Cr | Co | Mo | W |
|---|---|---|---|---|---|---|
| Blades 10 | 0 | .15 | 9.0 | 10.0 | 2.5 | 10.0 |
| Disc 26 | 0 | — | 12.7 | 9.4 | 1.9 | 4.0 |
| Braze Powder | 2.5 | .17 | 10.0 | 9.7 | .6 | 10.8 |

|  | Ta | Ti | Al | B | Zr | Hf | Ni |
|---|---|---|---|---|---|---|---|
| Blades 10 | 1.5 | 1.5 | 5.5 | .02 | .05 | 1.0 | Bal. |
| Disc 26 | 3.8 | 4.1 | 3.7 | .01 | — | .9 | Bal. |
| Braze Powder | 3.1 | 1.6 | 5.5 | 1.1 | .05 | 1.4 | Bal. |

Other suitable high alloy material examples are AF95, AF2-IDA and Astroloy.

The braze sealed parts are maintained under vacuum at a temperature of 2225° F. to 2250° F. for thirty minutes; thereafter the parts are cooled to 2000° F. and held at that temperature for ten minutes for solidification of sealant layers 36, 38. Subsequently, the temperature is raised to 2100° F. for one hour to allow the diffusion of boron and silicon into the base metal of base 12 and disc 26 to elevate the remelt temperature of the seals.

After sealing the joint lines 32, 34 the brazed assembly is visually inspected for integrity and leak checked by placing the assembly of FIG. 9 in a chamber of high pressure helium gas. After an appropriate exposure period, the sealed joints (layers 36, 38) are checked with a spectrometer for possible helium bleed back through pin hole or microscopic flaws in the braze seal layers 36, 38 that cover the joint lines 32, 34 respectively.

Following the helium leak check, the braze sealed assembly shown in FIG. 9 is subjected to a hot isostatic process for diffusion bonding the surface represented by the ID 22 to the surface represented by the rim 28. This process is accomplished at temperatures in the range of 2225° F. and the parts are subjected to direct argon gas pressure of 15,000 p.s.i. which is maintained for three hours. Following the hot isostatic press, the assembly is subjected to a coating diffusion cycle of 2050° F. for two hours followed by age heat cycle of 1600° F. for twenty four hours. The resultant butt type joint is shown at 40 in FIG. 10 which shows the joined parts in a sonic test fixture with a test sequence which is facilitated by the but configuration.

The inspection procedure includes a two transducer ultrasonic test method for inspecting the full circumference of the diffusion bonded butt joint 40 of a finished, hybrid turbine wheel 42.

The beginning of the sonic inspection sequence includes triggering a transmitting transducer 44 by applying an electrical input pulse to line 46 causing the transducer 44 to emit a burst 48 of ultrasonic energy. The energy is transmitted through a mass of water to the surface 50 of the hybrid wheel assembly where a large portion of the propagated energy 48 is reflected from the surface and a smaller portion thereof enters the part as shown along the dotted line path 52.

The ultrasonic energy in the part travels in a straight path until it reaches a reflection surface 54 caused by an unbonded region in the diffusion bonded butt joint 40. In the case of parts made by the present invention, the reflecting surface is an outer surface 56 on the assembly. Accordingly, reflected energy will continued either along a path 48 or a path 60 outwardly of the hybrid wheel assembly through a water couplant to a point where it is redirected by a metal reflector 62 to be detected by a transducer 64 which converts the ultrasonic energy back into electrical energy. A signal is directed from an output 66 of the transducer 64 and it is electrically processed to separate the signals from path 58 and path 60. The separated, reflected acoustical energy from the path 58 is utilized to produce a record of unbonded areas in the wheel assembly.

Figure 10:
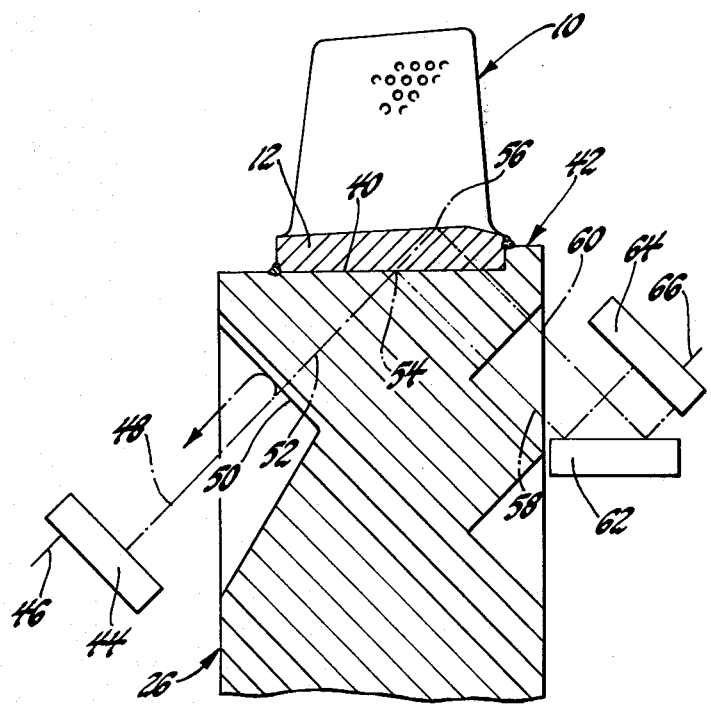
FIG. 10 shows the relationship between the joined parts following a hot isostatic process for producing a diffusion bond therebetween and with the joined parts located in an inspection fixture for evaluating a diffusion bonded but joint between the joined parts.

From aforesaid tests, it has been found that such wheel assemblies contain excellent metallurgical joints of the butt joint configuration as shown at 40 in FIG. 10 both in the rim and web areas of the wheel assembly.

The mechanical strength and durability characteristics of such resultant metallurgical joints are set forth in the following tables which show the test characteristics of joint samples taken as machined test bars from the region of the diffusion bonded butt joint 40.

| TYPICAL BUTT JOINT PROPERTIES ||||
|---|---|---|---|
| Tensile Tests ||||
| Test Temp. F. | | UTS, ksi | Failure Location |
| 70 | | 127.8 | Cast alloy |
| 1200 | | 128.6 | Cast alloy |
| 1400 | | 116.8 | Joint |
| Stress Rupture Tests ||||
| Test Temp. F. | Stress, ksi | Hours to Failure | Failure Location | Remarks |
| 1200 | 100 | 1000+ | — | Specimen discontinued |
| 1300 | 95 | 123.8 | Joint | |
| 1300 | 70 | 1281.0 | Joint | |
| 1400 | 75 | 254.8 | Parent Metal Disc | |
| 1500 | 50 | 56.0 | Joint | |
| Low-Cycle Fatigue Tests ||||
| Test Temp. F. | Max. Stress ksi | Cycles to Failure | Remarks |
| 70 | 120 | 35.033+ | Thread failure |
| 1100 | 100 | 130,000+ | Specimen discontinued |

In addition, it is to be understood that the embodiments of the present invention are not solely limited to axial turbine wheels or high temperature materials. Radial turbine and compressor wheels as well as titanium, steel and aluminum alloy combinations are obvious extrapolations of the hybrid processing concept. Further, although a butt type of attachment between airfoil and disc details is preferred because of simplicity of manufacture, the concept is not limited to this type of joint design.

While the embodiments of the present invention, as herein disclosed, constitute a preferred form, it is to be understood that other forms might be adopted.

The embodiments of the invention in which an exclusive property or privilege is claimed are defined as follows:

1. A method for fabricating a hybrid turbine engine wheel assembly comprising: preforming a bladed metal ring from superalloy material with airfoil blades having an exact dimensional control therebetween to maintain aerodynamic flow paths through the ring and with a base rim having a premachined close tolerance ID and a front side and a rear side, preforming a disc of high strength metal having a controlled OD, press fitting the bladed ring to the disc to form a near line-to-line interface therebetween with continuously circumferentially formed front and rear joint lines and with continuous contact across the full facing surface areas of both the base rim ID and the controlled OD of the disc from the front side to the rear side of the base rim ID thereby to prevent collapse of the interface and resultant loss of dimensional control between adjacent airfoils during a subsequent hot isostatic pressing of the joined bladed ring and disc, sealing the full extent of the joint lines with high melt temperature sealant to maintain a clean press fit at the interface between the outside diameter of the disc and the inside diameter of the bladed ring element and a sealed, pressure tight interface, and to define an exposed exterior planar extent on the bladed metal ring and the disc for receiving direct application of hot isostatic fluid without flow of such fluid into the interface, and thereafter hot isostatically pressing the joined bladed ring and disc by direct fluid pressure across the full exterior planar extent of the joined parts to form a diffused metallurgical bond between the base rim and the disc.

2. A method for fabricating a hybrid dual property turbine engine wheel assembly comprising: preforming a bladed ring with airfoil blades having an exact dimensional control therebetween to maintain aerodynamic flow paths through the ring and with a base rim thereon from a cast, corrosion and thermally resistant superalloy material, said base rim having a premachined close tolerance ID and a front side and a rear side, preforming a disc of consolidated powdered metal having a controlled OD, press fitting the bladed ring to the disc to form a near line-to-line interface therebetween with continuously circumferentially formed front and rear joint lines and with continuous contact across the full facing surface areas of both the base rim ID and the controlled OD of the disc from the front side to the rear side of the base rim ID thereby to prevent collapse of the interface and resultant loss of dimensional control between adjacent airfoils during a subsequent hot isostatic pressing of the joined bladed ring and disc, sealing the full extent of the joint lines with high melt temperature sealant to maintain a clean press fit at the interface between the outside diameter of the disc and the inside diameter of the bladed ring element and a sealed, pressure tight interface, and to define an exposed exterior planar extent on the bladed metal ring and the disc for receiving direct application of hot isostatic fluid without flow of such fluid into the interface, and thereafter hot isostatically pressing the joined bladed ring and disc by direct fluid pressure across the full exterior planar extent of the joined parts to form a diffused metallurgical bond between the base rim and the disc.

3. A method for fabricating a hybrid dual property turbine engine wheel assembly comprising: preforming a bladed ring with airfoil blades having an exact dimensional control therebetween to maintain aerodynamic flow paths through the ring and with a base rim thereon from a cast, corrosion and thermally resistant superalloy material, said base rim having a premachined close tolerance ID and a front side and a rear side, preforming a disc of consolidated powdered metal having a controlled OD, press fitting the bladed ring to the disc to form a near line-to-line interface therebetween with continuously circumferentially formed front and rear joint lines and with continuous contact across the full facing surface areas of both the base rim ID and the controlled OD of the disc from the front side to the rear side of the base rim ID thereby to prevent collapse of the interface and resultant loss of dimensional control between adjacent airfoils during a subsequent hot isostatic pressing of the joined bladed ring and disc, sealing the full extent of the joint lines with high melt temperature sealant to maintain a clean press fit at the interface between the outside diameter of the disc and the inside diameter of the bladed ring element and a sealed, pressure tight interface, said high melt temperature sealant being a boronsilicon modified braze powder, said braze powder being applied to cover the joint lines and thereafter held under vacuum while being heated to a temperature of 2225° F. for melting the powder to cover the joint lines, thereafter reducing the braze temperature to solidify the braze material and then increasing the braze temperature and maintaining it to permit diffusion of boron and silicon constituents into the parent material of the disc and bladed ring to elevate the remelt temperature of the sealant, and to define an exposed exterior planar extent on the bladed metal ring and the disc for receiving direct application of hot isostatic fluid without flow of such fluid into the interface, and thereafter hot isostatically pressing the joined bladed ring and disc by direct fluid pressure across the full exterior planar extent of the joined parts to form a diffused metallurgical bond between the base rim and the disc.

4. A method for fabricating a hybrid, dual property wheel assembly comprising the steps of preforming a plurality of blade elements of a first predetermined highly solidified alloy material having a base, fixturing said blade elements into a bladed ring and tack welding each of the blades together in the ring at an interface between each of the blades, vacuum seal brazing each of the exposed joint areas between the tack welded blades, hot isostatically pressing each of said blades with respect to one another to achieve diffusion bonding across the interface at each of the vacuum braze sealed joint areas, thereafter machining the inside diameter of the bladed ring, preforming a powdered metal disc with controlled OD, shrink fitting the bladed ring to the outer diameter of the powder metal disc to form a front and rear face joint line, sealing the front and rear face joint lines with a high melt temperature sealant, and thereafter hot isostatically pressing the joined bladed ring and disc to produce a diffusion bond between the bladed ring and the disc.

5. A method for fabricating a hybrid, dual property wheel assembly comprising the steps of preforming a plurality of blade elements of a first predetermined highly solidified alloy material having a base, fixturing said blade elements into a bladed ring and tack welding each of the blades together in the ring at an interface between each of the blades, vacuum seal brazing each of the exposed joint areas between the tack welded blades, hot isostatically pressing the assembly to achieve diffusion bonding across the interface at each of the vacuum braze sealed joint areas, thereafter machining the inside diameter of the bladed ring, preforming a powdered metal disc with controlled OD, shrink fitting the bladed ring to the outer diameter of the powder metal disc to form a front and rear face joint line, sealing the front and rear face joint lines with a high melt temperature sealant, said high melt temperature sealant being a boron-silicon modified braze powder, said braze powder being applied to cover the joint lines and thereafter held under vacuum while being heated to a temperature of 2225° F. for melting the powder to cover the joint lines, thereafter reducing the braze temperature to solidify the braze material and then increasing the braze temperature and maintaining it to permit diffusion of boron and silicon constituents into the parent material of the disc and bladed ring to elevate the remelt temperature of the sealant, and thereafter hot isostatically pressing the joined bladed ring and disc to produce a diffusion bond between the bladed ring and the disc.

* * * * *